US012503319B2

(12) United States Patent
Bonnain et al.

(10) Patent No.: US 12,503,319 B2
(45) Date of Patent: Dec. 23, 2025

(54) SMOOTH HANDOFF OF CONTAINERS USING MULTIPLE GRIPPERS

(71) Applicant: WestRock Packaging Systems, LLC, Atlanta, GA (US)

(72) Inventors: Jean-Christophe Bonnain, Châteauroux (FR); Frederic Limousin, Le Poinçonnet (FR); Fabrice Avril, Châteauroux (FR); Amelie Strohm-Volondat, Châteauroux (FR)

(73) Assignee: WestRock Packaging Systems, LLC, Atlanta, GA (US)

( * ) Notice: Subject to any disclaimer, the term of this patent is extended or adjusted under 35 U.S.C. 154(b) by 0 days.

(21) Appl. No.: 18/635,590

(22) Filed: Apr. 15, 2024

(65) Prior Publication Data

US 2024/0409325 A1 Dec. 12, 2024

Related U.S. Application Data

(63) Continuation of application No. 17/385,446, filed on Jul. 26, 2021, now Pat. No. 11,958,698.

(60) Provisional application No. 63/056,093, filed on Jul. 24, 2020.

(51) Int. Cl.
*B65G 47/86* (2006.01)
*B65G 54/02* (2006.01)

(52) U.S. Cl.
CPC ......... *B65G 47/842* (2013.01); *B65G 47/847* (2013.01); *B65G 54/02* (2013.01); *B65G 2201/0252* (2013.01)

(58) Field of Classification Search
CPC .... B65G 54/02; B65G 47/842; B65G 47/847; B65G 2201/0252

USPC ......................................................... 198/805
See application file for complete search history.

(56) References Cited

U.S. PATENT DOCUMENTS

| 3,330,400 A | 7/1967 | Alexander |
| 3,523,604 A | 8/1970 | Babunovic |
| 3,572,490 A | 3/1971 | Babunovic |
| 3,866,737 A | 2/1975 | Simon |

(Continued)

FOREIGN PATENT DOCUMENTS

| DE | 3306278 A1 | 8/1984 | |
| DE | 102013112091 A1 * | 5/2015 | ........... B65G 47/842 |

(Continued)

OTHER PUBLICATIONS

PCT International Search Report issued in PCT Application No. PCT/US2021/043239 dated Nov. 4, 2021 (15 pages)—Previously cited in parent case U.S. Appl. No. 17/385,446.

(Continued)

*Primary Examiner* — James R Bidwell
(74) *Attorney, Agent, or Firm* — Rohini K. Garg; Brian J. Goldberg; Tsugihiko Suzuki

(57) ABSTRACT

A conveyor system for grouping containers includes a first track including a first plurality of lugs, each lug having a respective gripper coupled thereto configured to drive containers along the first track and a second track configured to move a second plurality of lugs wherein each of the lugs is coupled to a respective gripper configured to receive containers from the first track, and move the containers along the second track wherein the grippers of the second track contact the container while the gripper of the first track contacts the container.

20 Claims, 20 Drawing Sheets

(56) References Cited

U.S. PATENT DOCUMENTS

| | | | |
|---|---|---|---|
| 4,109,446 A | 8/1978 | Alexander | |
| 6,484,478 B1 | 11/2002 | Arends | |
| 9,181,042 B2 | 11/2015 | Fahldieck | |
| 9,994,401 B2 | 6/2018 | Zetterstrom | |
| 10,252,828 B2 | 4/2019 | Sorbi | |
| 11,186,443 B2 | 11/2021 | Boarin | |
| 11,958,698 B2 * | 4/2024 | Bonnain | B65G 47/088 |
| 2018/0141688 A1 | 5/2018 | Choplin et al. | |
| 2018/0186579 A1 | 7/2018 | Choplin | |
| 2019/0099936 A1 | 4/2019 | Voth et al. | |
| 2020/0346879 A1 | 11/2020 | Niehr et al. | |
| 2021/0086938 A1 | 3/2021 | Marcantoni | |

FOREIGN PATENT DOCUMENTS

| | | | | |
|---|---|---|---|---|
| EP | 126553 A | | 11/1984 | |
| EP | 2980010 A1 | * | 2/2016 | B65B 3/04 |
| EP | 3831728 A1 | | 6/2021 | |
| JP | S51026870 A | | 9/1976 | |
| JP | S51038151 A | | 10/1976 | |
| JP | 2001213408 A | | 8/2001 | |
| WO | 02064464 A1 | | 8/2002 | |
| WO | 2015/189277 A1 | | 5/2015 | |

OTHER PUBLICATIONS

European Search Report issued in corresponding U.S. Appl. No. 17/385,446 on Dec. 15, 2021. (8 pages)—Previously cited in parent case U.S. Appl. No. 17/385,446.
JP Office Action dated Aug. 5, 2025, 7 pages.

\* cited by examiner

SMOOTH HANDOFF OF CONTAINERS USING MULTIPLE GRIPPERS

CROSS-REFERENCE TO RELATED APPLICATIONS

The present application is a continuation of Ser. No. 17/385,446 filed on 26 Jul. 2021, now U.S. Pat. No. 11,958,698 issued 16 Apr. 2024 which claims the benefit of priority to U.S. Provisional Patent Application Ser. No. 63/056,093 filed on 24 Jul. 2020, the contents of each of which are incorporated herein by reference in their entirety.

BACKGROUND

Technological Field

The present disclosure relates to a packing system, and more particularly to system using two independent tracks.

Description of Related Art

In the field of packaging it is often required to provide consumers with a package comprising multiple primary produce containers, such multi-packs are desirable for shipping and distribution and for display of promotional information.

It is desirable to provide a compact packaging machine, one with a reduced footprint, i.e. one that occupies less area or space within a production facility, but one that is able to display the promotional or product information properly. It is an object of the disclosure to present a system capable of organizing products into packages and orienting them in the proper way. The conventional methods and systems have generally been considered satisfactory for their intended purpose. However, there is still a need in the art for a system having improved packaging and organizing capabilities while maintaining a small footprint. The present disclosure may provide a solution for at least one of these remaining challenges.

SUMMARY OF THE INVENTION

A method of grouping containers into a package of containers includes conveying a stream of containers using a first plurality of grippers along a portion of a first track, transferring the containers to a second plurality of grippers by moving the containers by a gripper of the second plurality of grippers while maintaining contact with the first plurality of grippers along a second portion of the first track, and withdrawing the gripper of the first plurality of grippers from contacting the container of the stream of containers. The gripper of the second plurality of grippers can contact the container below the gripper of the first plurality of grippers. The gripper of the first plurality of grippers can turns along a curve of the first track after withdrawing. The gripper of the first plurality of grippers and the gripper of the second plurality of grippers can drive a respective container at the same velocity while driving the container. The gripper of the second plurality of grippers can approach the container perpendicular to the second track in order to initially contact the container.

The method can also include maintaining an orientation of each container when the gripper of the first plurality of grippers is withdrawn. The gripper of the first plurality of grippers can accelerate after initially contacting the container. The gripper can accelerates along a first curved section of the track. The gripper of the first plurality of grippers can maintains a constant speed during a straight portion of the first track. The gripper of the first plurality of grippers can decelerate when withdrawing the gripper of the first plurality of grippers from contacting the container. The gripper can accelerate after withdrawing the gripper of the first plurality of grippers from contacting the container.

A conveyor system for grouping containers includes a first track including a first plurality of lugs, each lug having a respective gripper coupled thereto configured to drive containers along the first track, and a second track configured to move a second plurality of lugs wherein each of the lugs is coupled to a respective gripper configured to receive containers from the first track, and move the containers along the second track wherein the grippers of the second track contact the container while the gripper of the first track contacts the container. The first plurality of grippers and the first plurality of lugs can be configured to move about a horizontal plane and the second plurality of grippers and the second plurality of lugs can be configured to move about a vertical plane. The first track can follow an oval. The first track can include at least a first rounded section, a first straight section, a second rounded section, and a second straight section. The first track can include a third straight section.

The second track can follow an oval and include at least one protuberance configured to actuate the second plurality of grippers in an orthogonal to a direction of travel of the stream of containers. The first track can include a linear motor drive configured to actuate each of the first plurality of lugs along the track. The first track can include a linear chain configured to actuate each of the first plurality lugs carriers along the first track. The second track can includes a linear motor drive configured to actuate each of the lugs along the second track.

The first track and the second track can partially overlap each other. The first track and the second track can be partially aligned.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
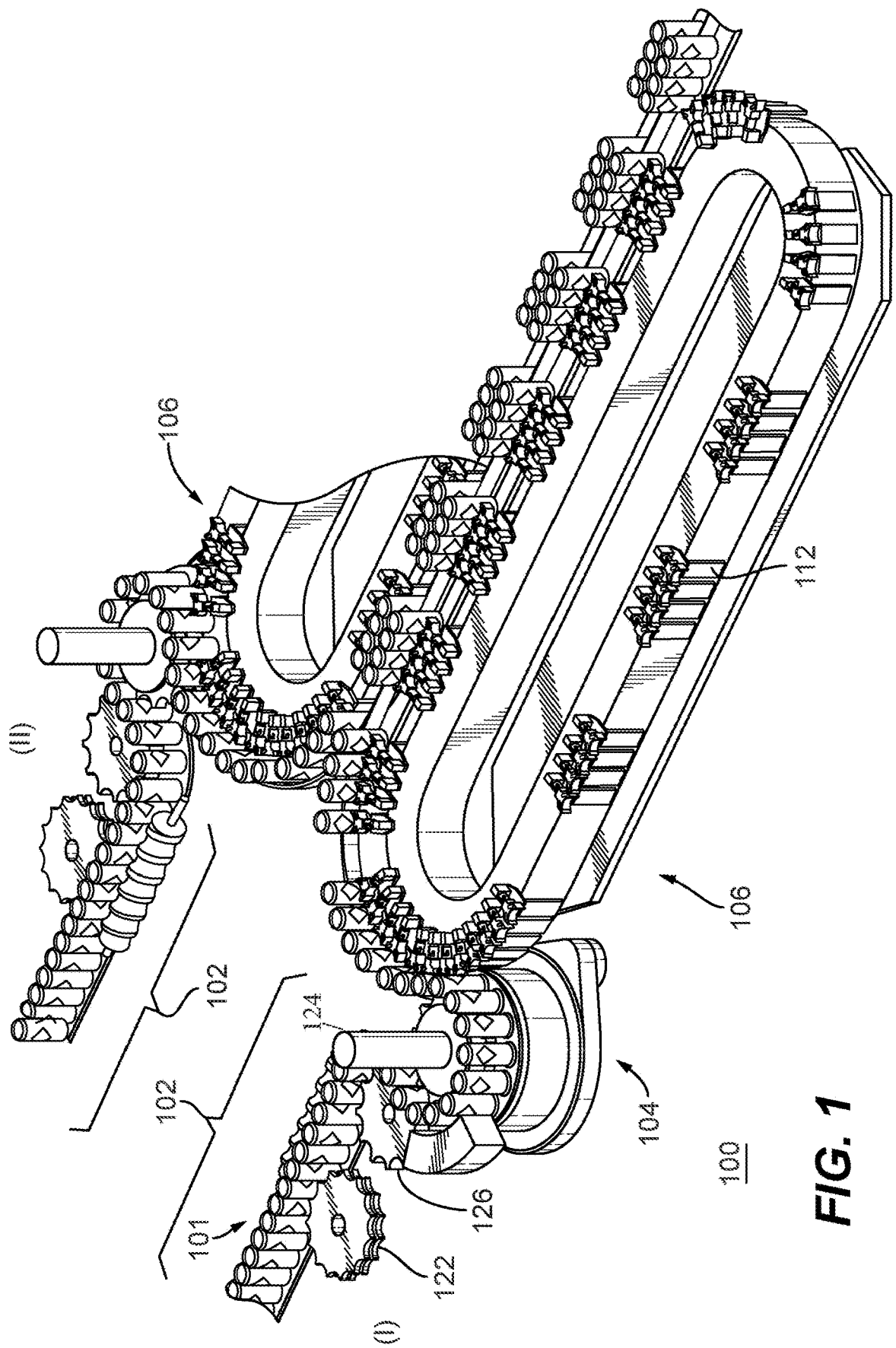
FIG. 1 is a perspective view of a system for packaging containers.

Reference will now be made to the drawings wherein like reference numerals identify similar structural features or aspects of the subject invention. For purposes of explanation and illustration, and not limitation, a partial view of an exemplary embodiment of a system for creating packages in accordance with the disclosure is shown in FIG. 1 and is designated generally by reference character 100. Other embodiments of the system and aspects thereof, are provided in FIGS. 2-17, as will be described. The methods and systems of the invention can be used to meter a stream of containers, orient each container in desired orientation and maintain that orientation throughout a packaging process.

FIG. 1 shows a system 100 capable of receiving a stream of containers 101, scanning containers 101, then orienting them into a desired direction, and organizing them into groups while maintaining the desired orientation for packaging them into packs or packages. The system 100 shown in FIG. 1 includes two mirrored sets (I and II) of modules. Each set has the same three types of modules. Each of the modules, their capabilities, details, and possible configurations will be described in detail below. Each set (I/II) includes the following modules: a conveying module 102, an orienting module 104, and a grouping module 106, one of which is labeled in FIG. 1 for set I, the other of which is only partially shown in FIG. 1 for set II. The conveying modules 102 are each configured for receiving the stream of containers 101 and providing an initial spacing and metering the containers 101. Each orienting module 104 is configured for scanning and orienting the containers as necessary. The grouping modules 106 are each configured for organizing the oriented containers 101 into packs and groups. Although two sets I and II are shown in FIG. 1, each module in the subsequent figures and in the description below will be discussed as part of an individual set, not including its mirrored counterpart.

The system 100 offers multiple benefits over previous conveyor systems in a world that demands faster and more efficient production techniques. The following is a non-exhaustive list of the benefits offered by system 100: it allows users a faster and more convenient changeover between differing container sizes and types, the system allows for faster, more reliable, and more effective methods of packaging containers into groups, all while taking up less factory floor space.

Figure 2:
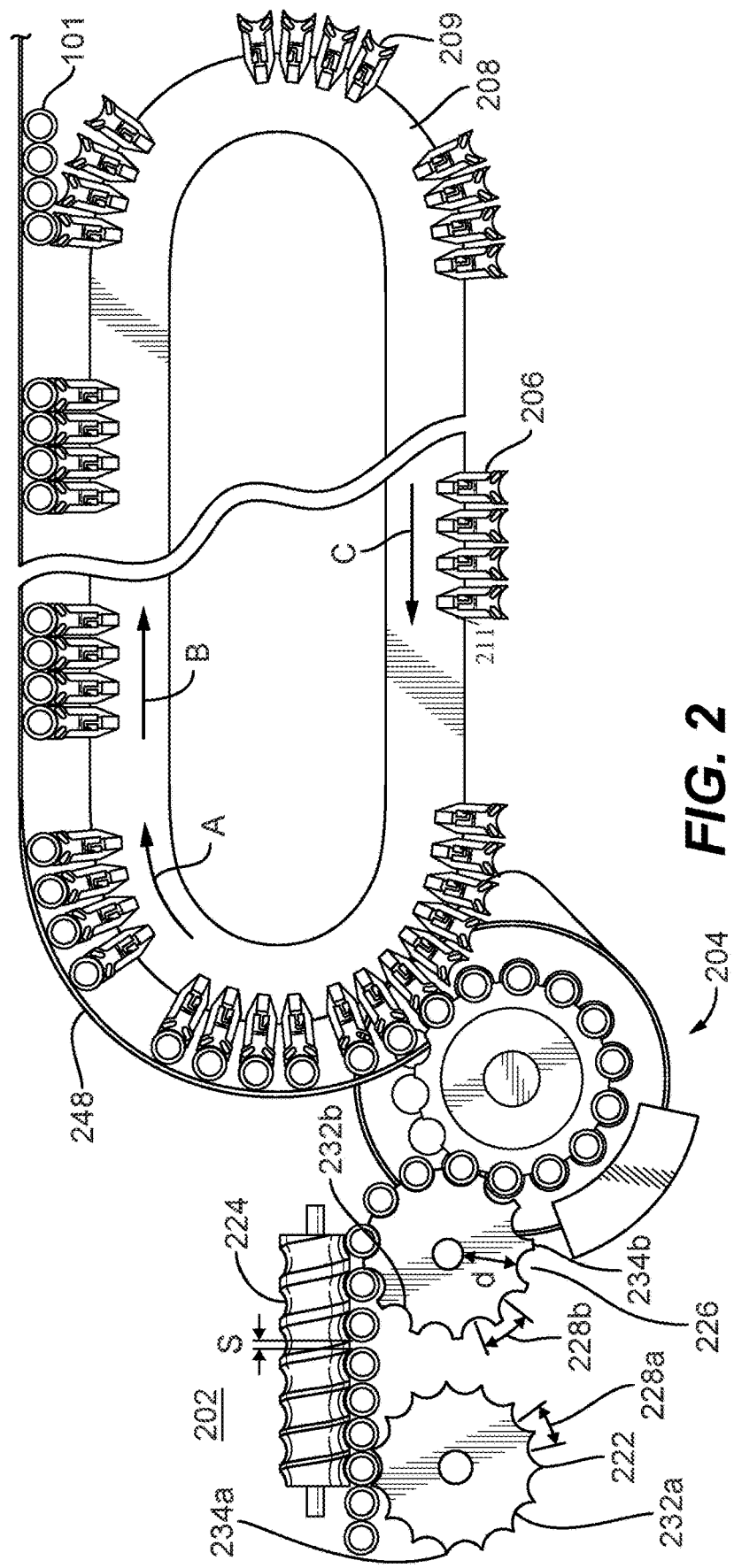
FIG. 2 is a top view of the system of FIG. 1, showing a layout of one of the sets of modules.

FIG. 2 shows an embodiment of one of the sets of modules, i.e. set I, of the system 100. Set I includes a conveying module 202, an orienting module 204, and grouping module 206 consisting of a single oval track 208 wherein grippers 209 attached to lugs 211 that move the containers 101 along the track 208. Each lug 211 is driven about the track 208 by its own respective linear servo drive 112 (shown in FIG. 1). This allows for programming of a specific speed profile for each lug 211 or group of lugs, which can move separately from one another to form groups of containers 101. Another added benefit of the horizontal oval configuration of the track 208 is when power to the system is lost, the lugs 211 stay in place and are not moved by gravity and do not fall from the track 208.

Figure 3:
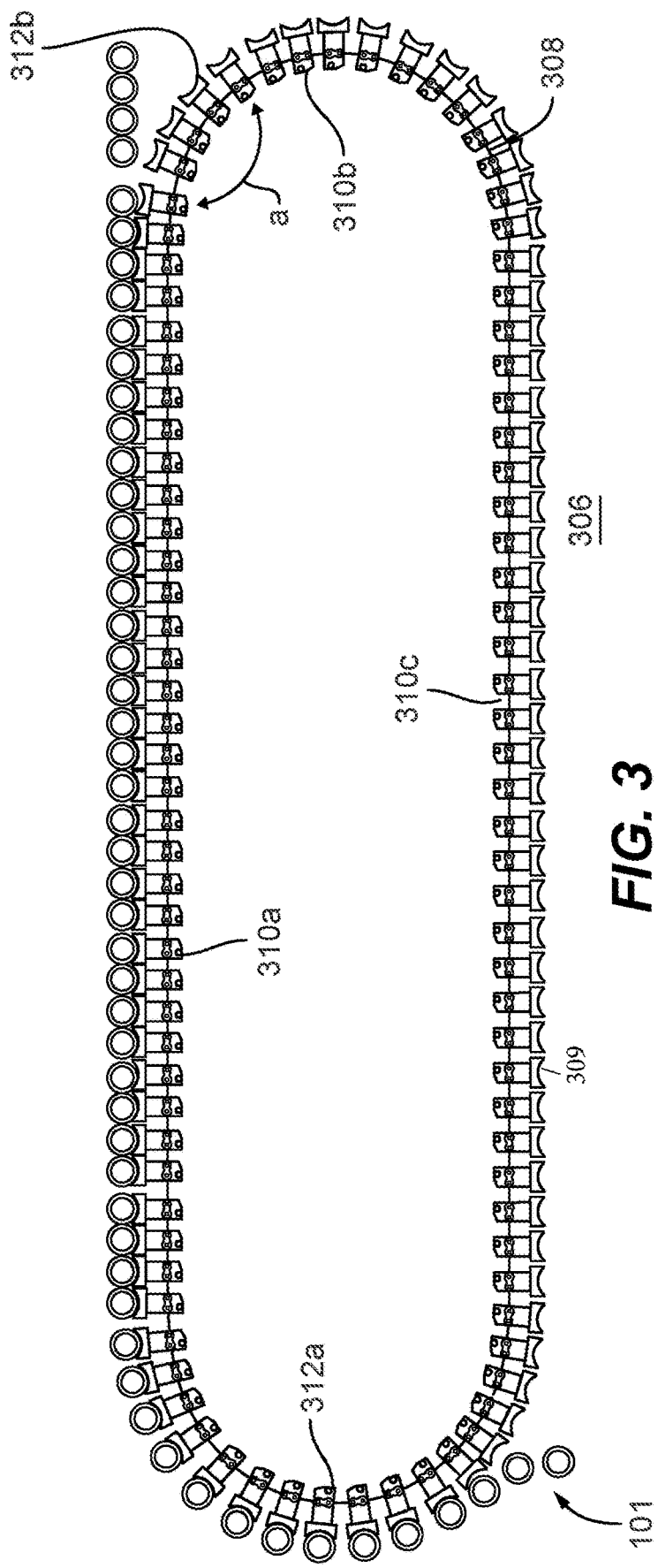
FIGS. 3-6 are top views of the system of FIG. 1, showing various embodiments of the grouping modules of FIG. 1.
Figure 4:
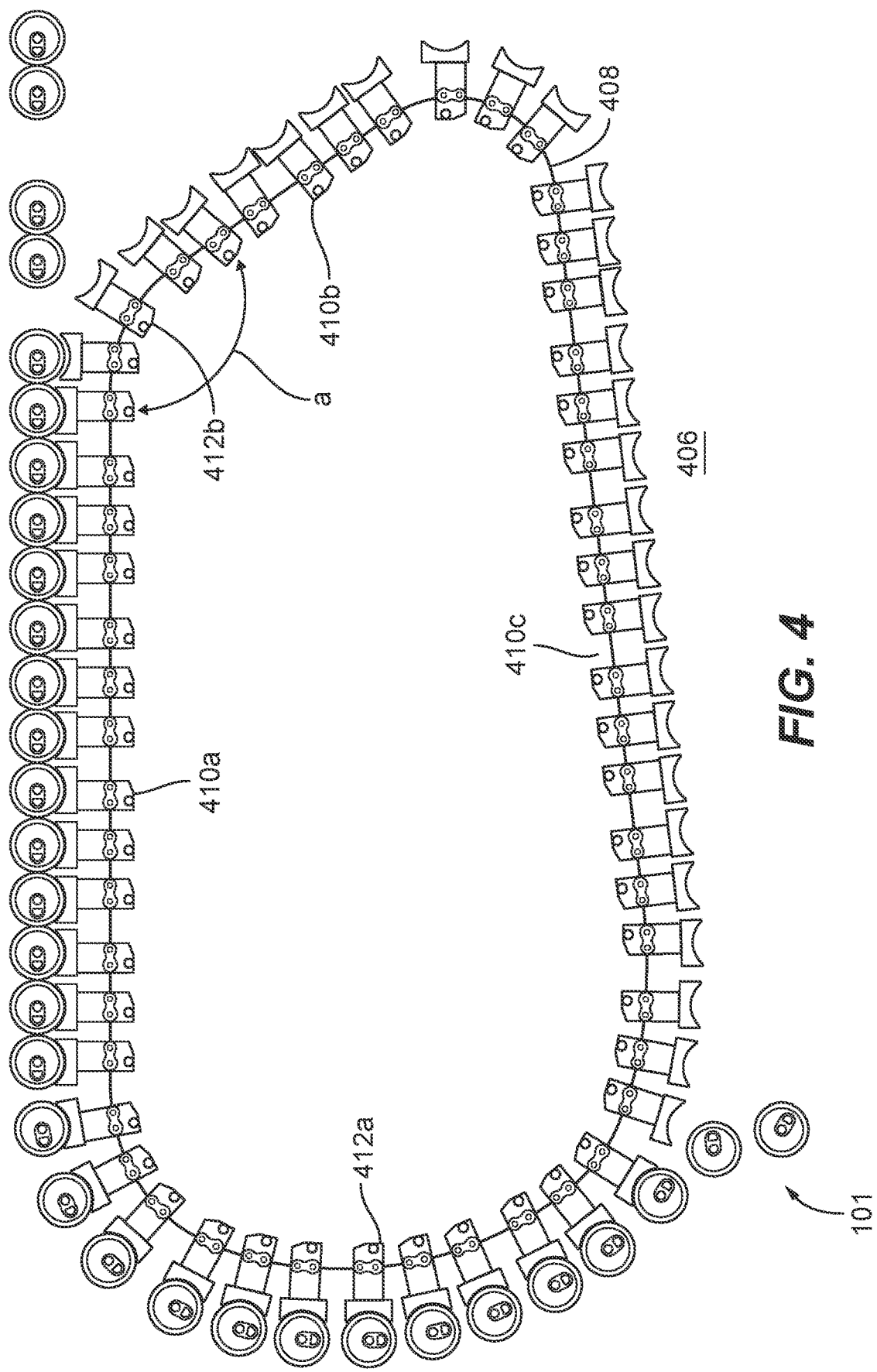
Figure 5:
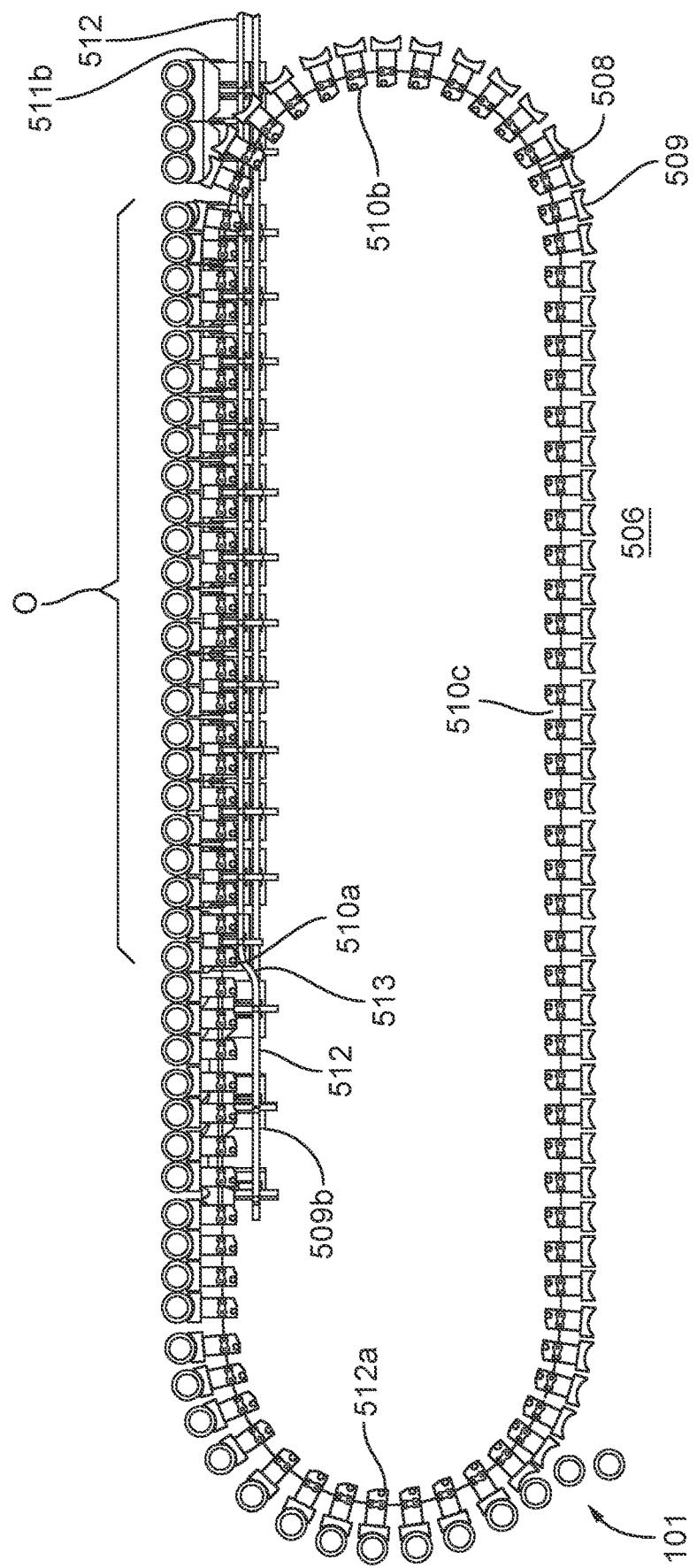
Figure 6:
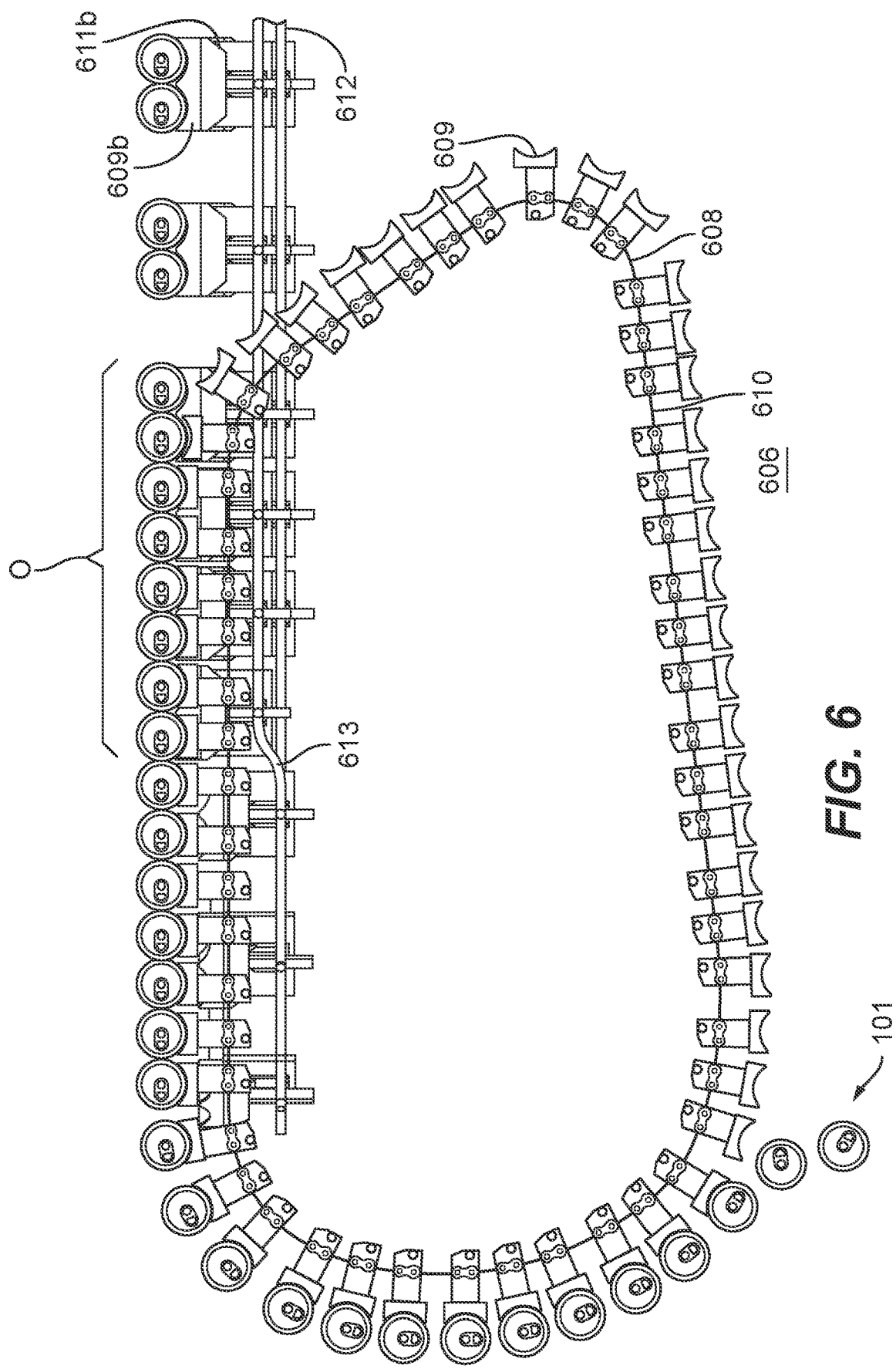

FIG. 3 shows an embodiment including a grouping module 306 having a single oval track 308 wherein grippers 309 that move the containers 101 along the track 308 are each moved about the track 308 by a chain 310. FIG. 4 shows an embodiment of a grouping module 406 including a single track 408 including at least three straight sections 410a, 410b, and 410c, and at least two curved sections 412a and 412b. FIG. 5 shows an embodiment of a grouping module 506 including an oval track 508 where the grippers 509 that move the containers 101 along the track 508 are each moved by a chain 510 and second track 512 is disposed in a vertical plane that takes the container hand-off from the first track 508. The track 508 including at least two straight sections 510a and 510b and two curved sections 512a and 512b The second track uses a second set of grippers 509b and second set of lugs 511b to transport the containers after receiving them from the first track. FIG. 6 a grouping module 606 consisting of an oblong track 608, as with the embodiment of FIG. 4, where grippers 609 that move the containers 101 along the track 608 are each moved about the track by a chain 610 and second track 612 is also disposed in a vertical plane that receives container 101 from the first track 608. Each of these embodiments include unique benefits as will be described below.

Each conveying module 102, 202, 302, 402, 502, 602, mentioned above, receives a stream of containers 101. Tracks 208, 308, 408, 508, 608 can all be used with a conveying module 102 as shown in FIG. 1. At this point, the stream of containers 101 typically does not have spacing between each container 101. As the stream of containers 101 reaches the conveying module 102 the stream meets a first star-wheel 122, which helps straighten the stream 101 and feed the containers of the stream to a metering screw 124. The metering screw 124 creates a pitch or predetermined spacing(s) between each of the containers. The metering screw 124 then feeds the spaced stream of containers 101 to a second star-wheel 126. The second star-wheel 126 has a different shape than the first star-wheel 122. As seen in FIG. 2, the second star-wheel 226 has a larger spacing between the centers 228a of each adjacent divot 232, and second star-wheel 226 also includes a wider tooth 234b than that of the first star-wheel 222. However, the size of the divot 232 of each star-wheel remains the same, in order to accept and handle a container 101 of the same diameter. It is also considered that star-wheels with non-circular divots can be used in order to convey non-circular containers such as juice boxes, milk cartons, or motor oil. The second star-wheel 226 typically has a smaller diameter and spins faster than the first star-wheel 222. This combination of star-wheels 222, 226, taken alone and in combination with others, allows for a more compact footprint of the conveying module 202 and of the overall system.

Figure 7:
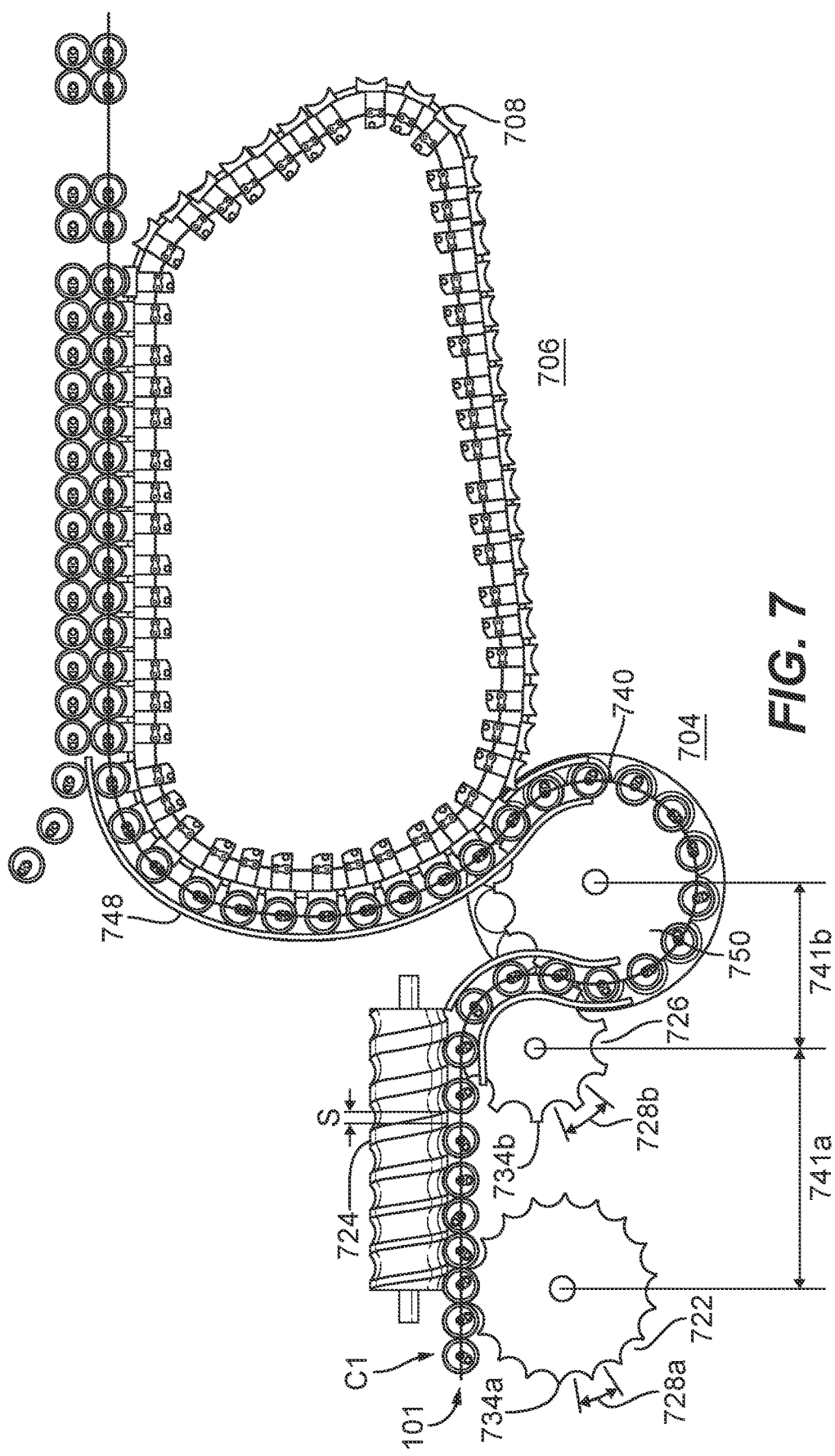
FIGS. 7-9C are top views of the conveyor modules of the system of FIG. 1, showing equivalent paths for containers of various sizes through the conveyor module and the orienting module.
Figure 7A:
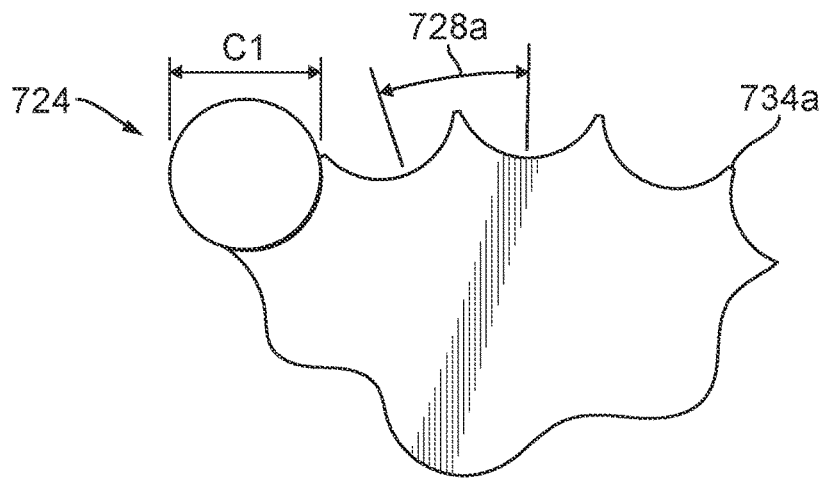
Figure 7B:
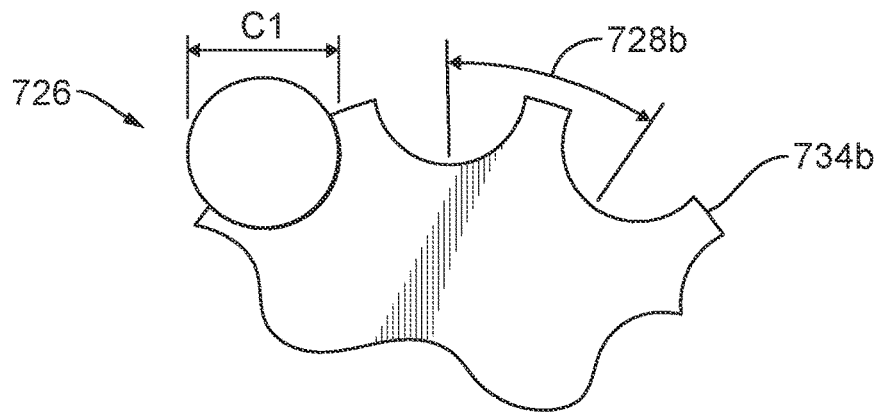
Figure 7C:
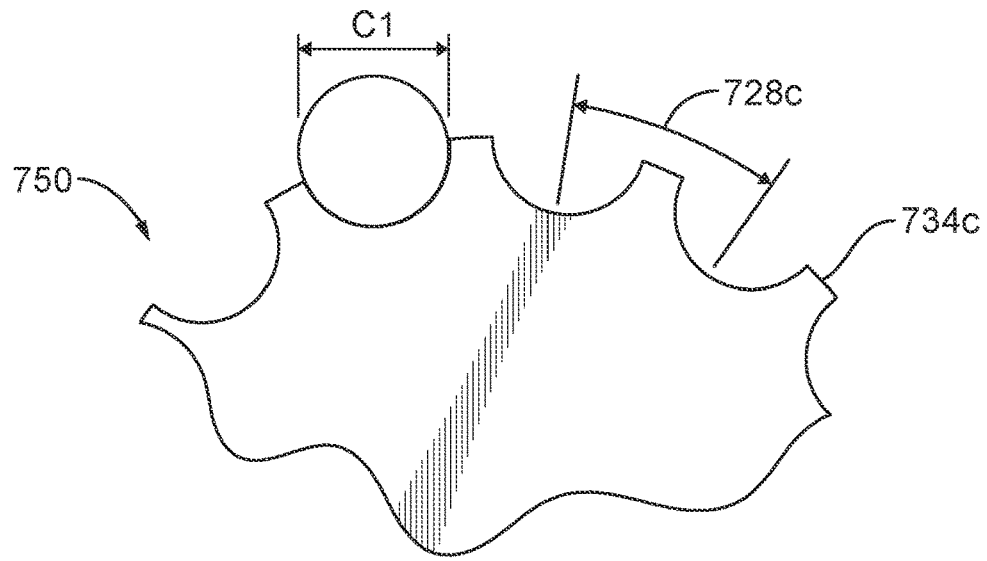
Figure 8:
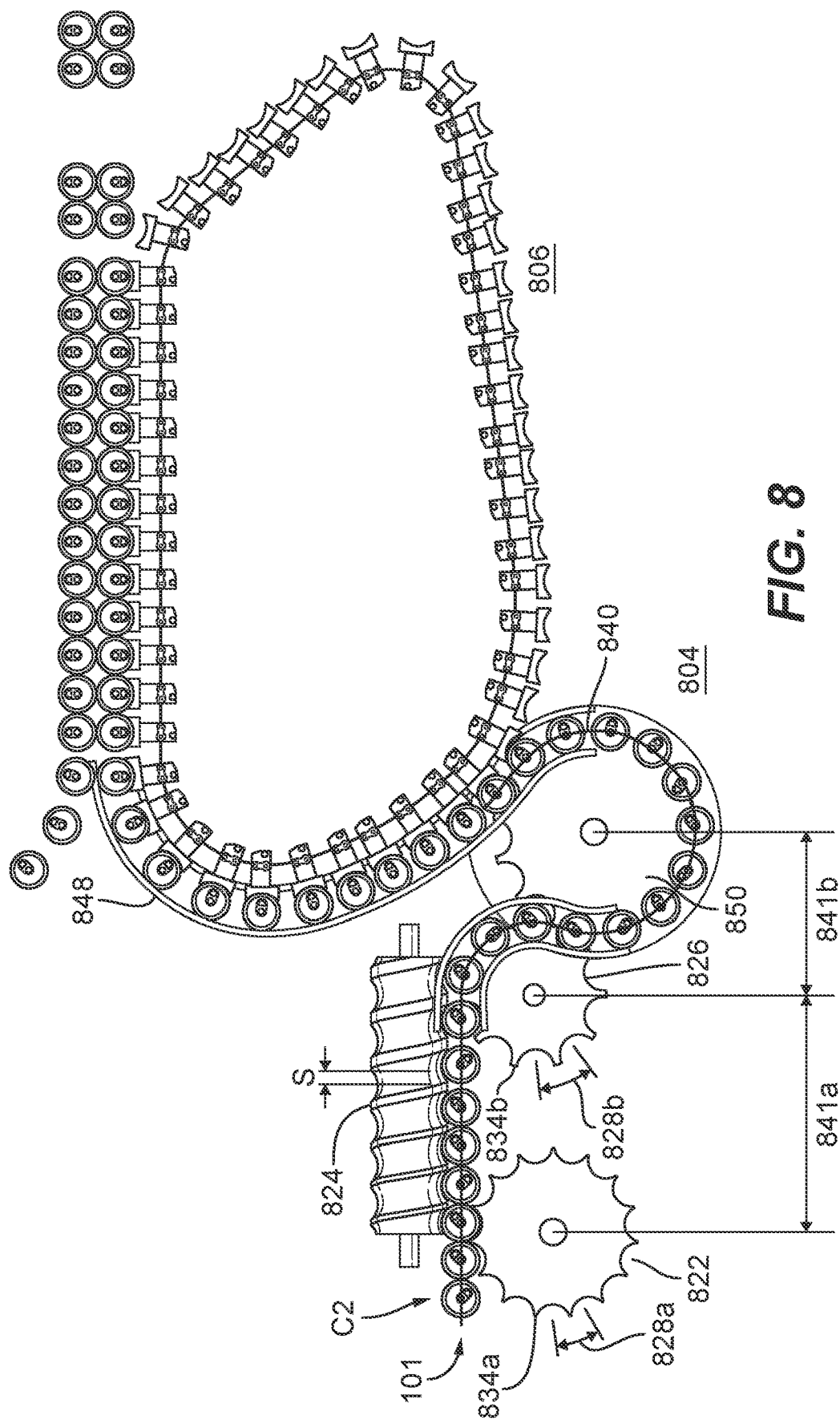
Figure 8A:
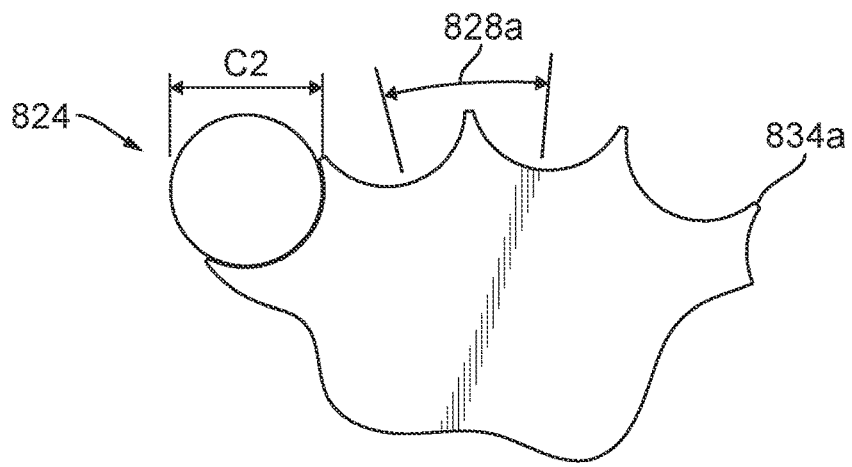
Figure 8B:
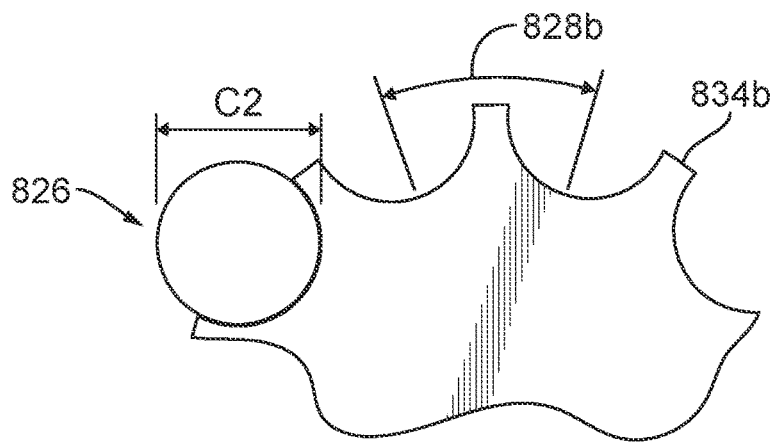
Figure 8C:
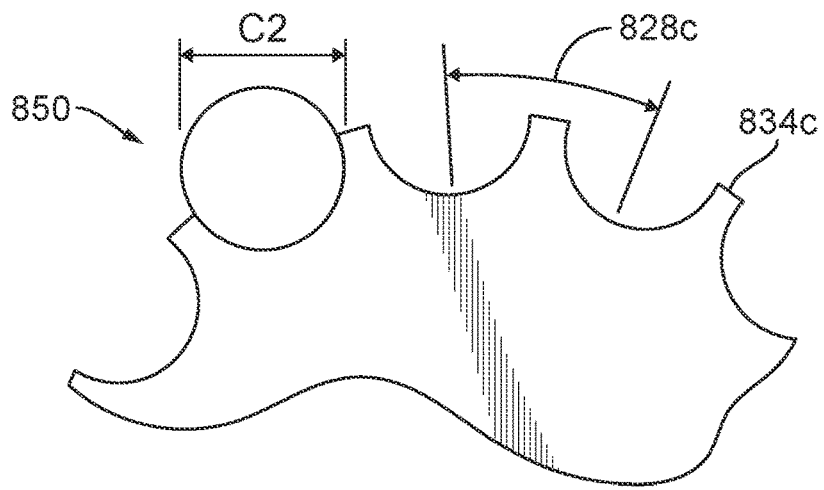
Figure 9:
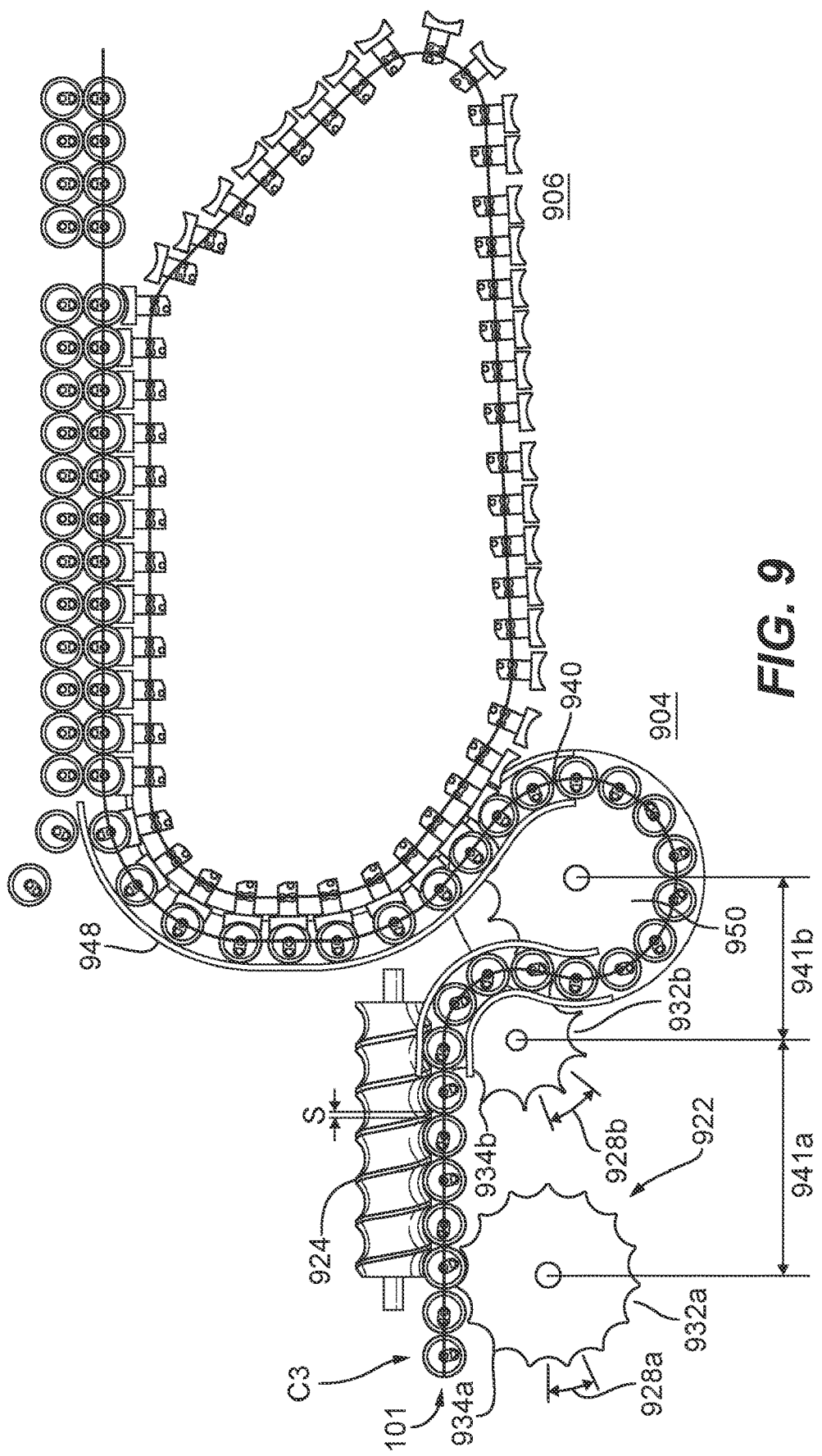
Figure 9A:
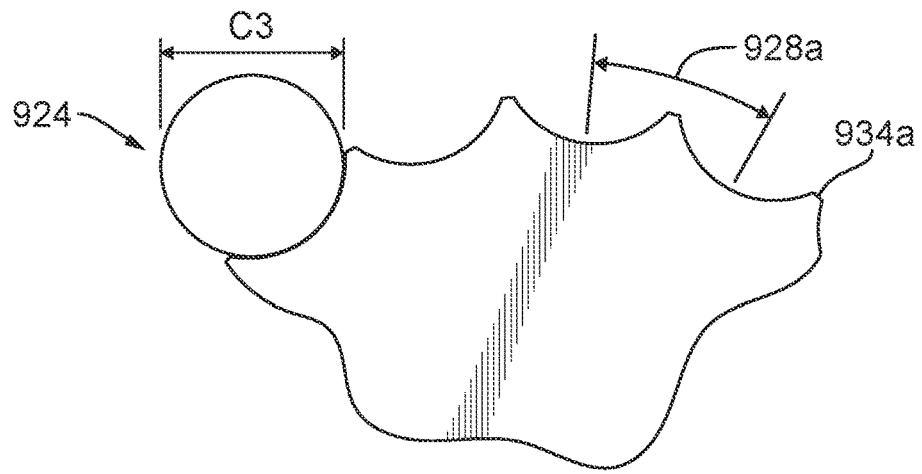
Figure 9B:
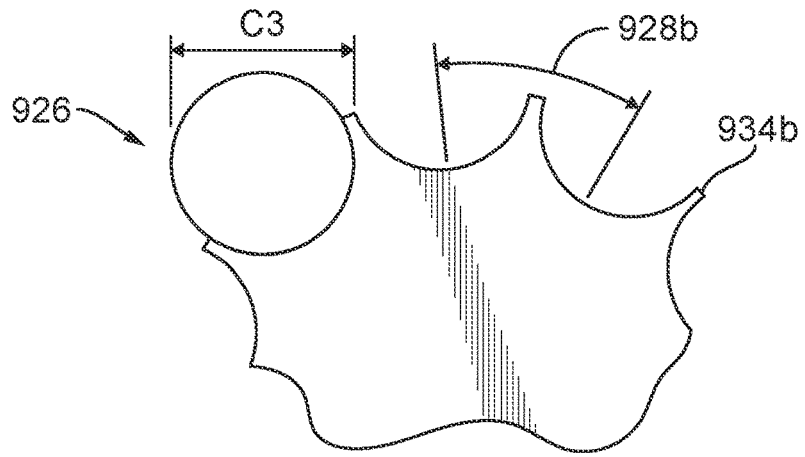
Figure 9C:
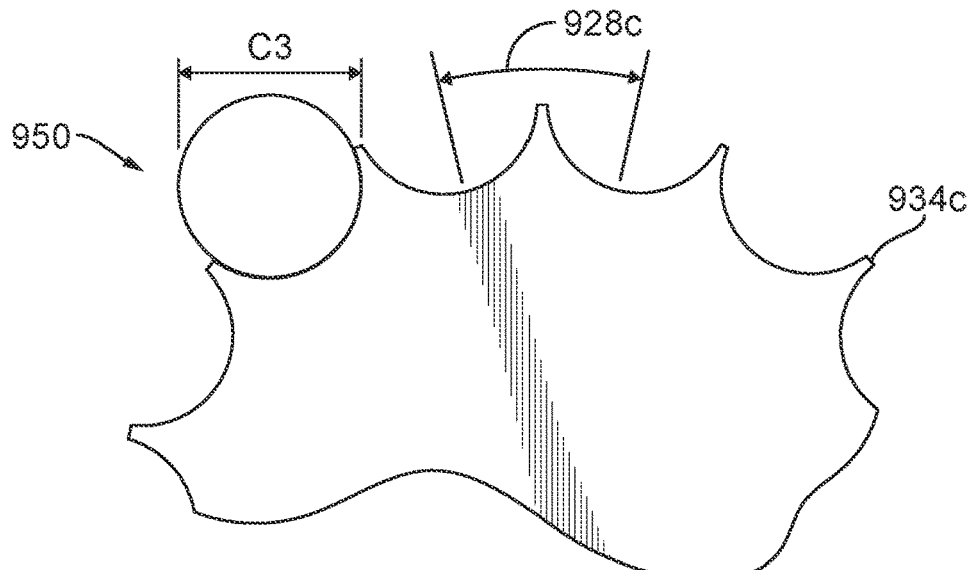

As seen in FIGS. 7-9, the stream of containers 101 forms a path 740 for the stream of containers 101 from the first star-wheel 722 to the first track 708 of the grouping module 706. The path 740 is defined by travel path of the center of each container 101. The path 740 stays substantially the same even if the diameter of the containers 101 changes, e.g. after switching out star wheels to change container size as described above. When comparing FIGS. 7, 8, and 9, the containers 101 of FIG. 7 are smaller than the containers 101 of FIGS. 8 and 9. However, the path 740 of the centers of the containers 101 substantially the same starting from the first star-wheel 722 of the conveying module 702 through the star-wheel 750 of the orienting module 704. The path 740 is maintained by swapping-out the first star-wheel 722, the metering screw 724, the second star-wheel 726 and the star-wheel of the orienting module 750 for a corresponding one of these parts. Each of these parts 722, 724, 726 are swapped out for corresponding parts having the same amount of teeth 734 and divots 732, but a deeper and wider divot 732, and thinner teeth 734 (for larger containers 101) or a thicker tooth 734 and narrower divot 732 (for smaller containers 101). FIG. 7a-7c show the details of each of the star wheels, which can be interchanged as needed with the star wheels shown in FIGS. 8a-8c, and 9a-9c. The axis on which each of the components 722, 724, 726 rotates stays the same after changing star wheels 722, 726. Further, the distances 741a and 741b stay the same between FIGS. 8 and 9, where they are labeled 841a and 841b and 941a and 941b. The star-wheels 822, 826 are left on the same vertical axels and the metering screw 824 is left on the same horizontal axel. This allows a system 100 to be easily changed for an infeed container 101 with a different diameter, e.g., different can diameter.

As seen in FIGS. 7-9, the path of the containers 101 after the orienting module 704/805/904 is different from FIG. 7 to FIG. 8 to FIG. 9. In previously used systems, the placement of each module differs from FIG. 7 to FIG. 8 to FIG. 9, which in turn required more movement of modules and lengthier changeover times between different sized/shaped containers. This system saves time in changeovers, e.g. for different can sizes, and reduces the possibility of errors in those changeovers because less parts have to be moved to accommodate differing parts.

Figure 10:
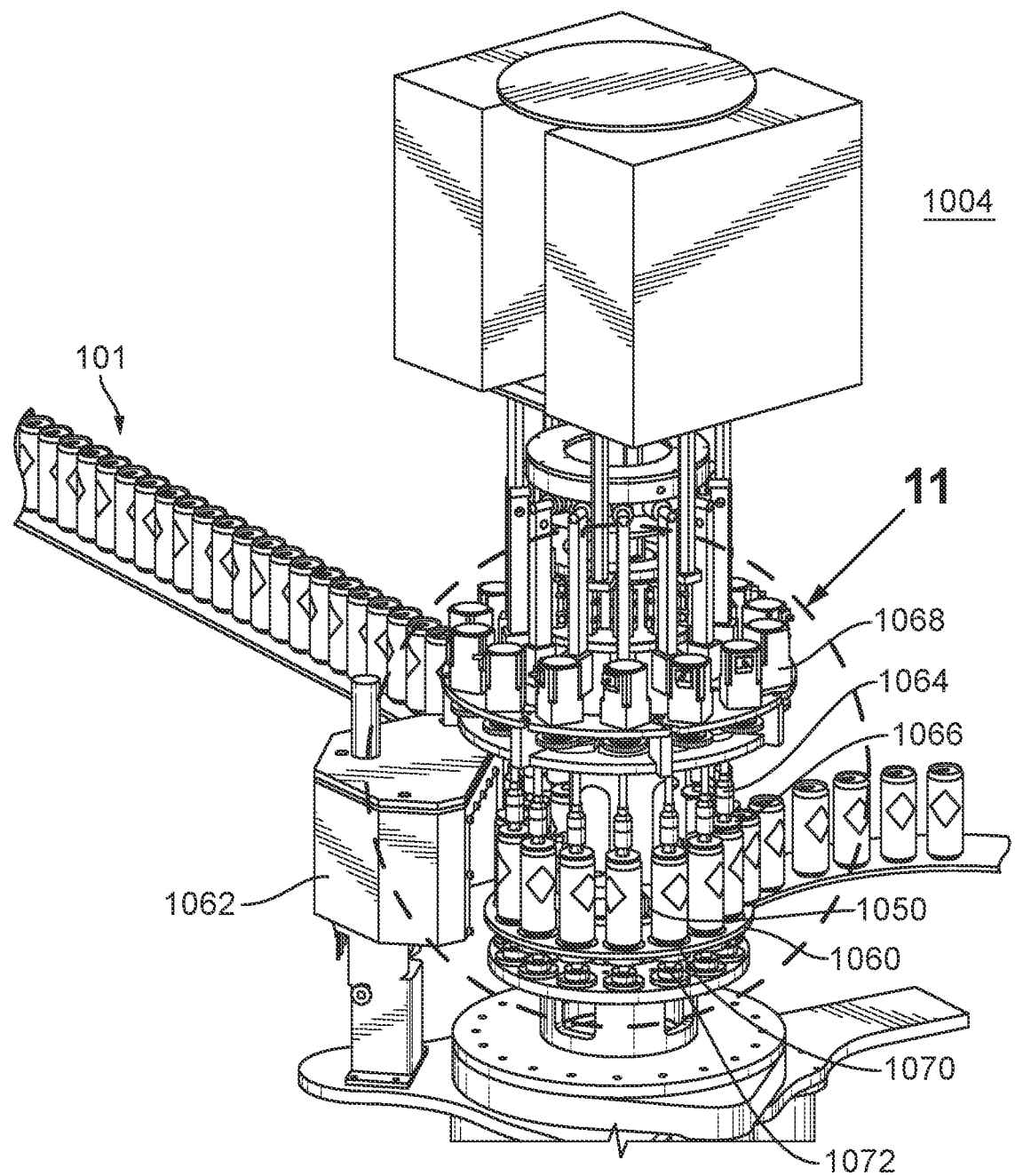
FIG. 10 is a perspective view of the orienting module of the system of FIG. 1.

As each container 101 passes the second star-wheel 726, the container 101 is fed to the orienting module 704. FIG. 10 shows a perspective view of the orienting module 1004. The orienting module includes a base 1060, which supports the incoming containers 101, a camera 1062 located to the side of the base 1060, scanning the containers container 101 and a plurality of turning members 1064 moveably positioned above the base 1060 that contact and turn the containers 101. A processor (not shown) is operatively connected to the camera 1062. The processor analyzes the initial orientation of the containers 101, i.e. before they are properly oriented. In some embodiments it is considered that the camera 1062 is required to scan every single container, and in other embodiments the camera 1062 is only required to scan every second, or third or fourth container. Depending on downstream packaging steps, and client specifications, each and every container 101 might be required to face the same direction. After the incoming orientation of the containers 101 has been analyzed, the processor computes a necessary correction. Each container 101 needs a different correction from the other containers 101 because the incoming orientation could be different, and/or because the final orientation needs to be different for each container 101.

Multiple containers 101 can be used to create a single large graphic when placed adjacent to each other within the package. Adjacent containers within one package can have a different orientation showing a different graphic or portion of a graphic to a customer. Alternatively, adjacent containers can form one large graphic seen across multiple containers. For instance the graphic "CANS" can consist of four containers. Each container can be showing either a 'C', an 'A', an 'N' or an 'S'.

The orientation module star-wheel 1050 is positioned above the rotatable base 1060 to help secure the containers 101 as they rotate past the camera 1062. As the containers 101 move past the camera 1062 the orientation star wheel helps guide them, and provide further stability as they get oriented. The star-wheel 1050 of the orienting module 1004 has the same spacing between centers of adjacent divots 1032 as the second star-wheel 1026 of the conveying module 1002, as well as the same tooth 1034 thickness. It is important to maintain spacing between each container 101 so that the camera 1062 is able to properly identify the incoming orientation of each container 101. Without spacing between each container 101 adjacent containers 101 will be recognized as a single item by the camera, and will not be able to transmit required information to the processor.

Figure 11:
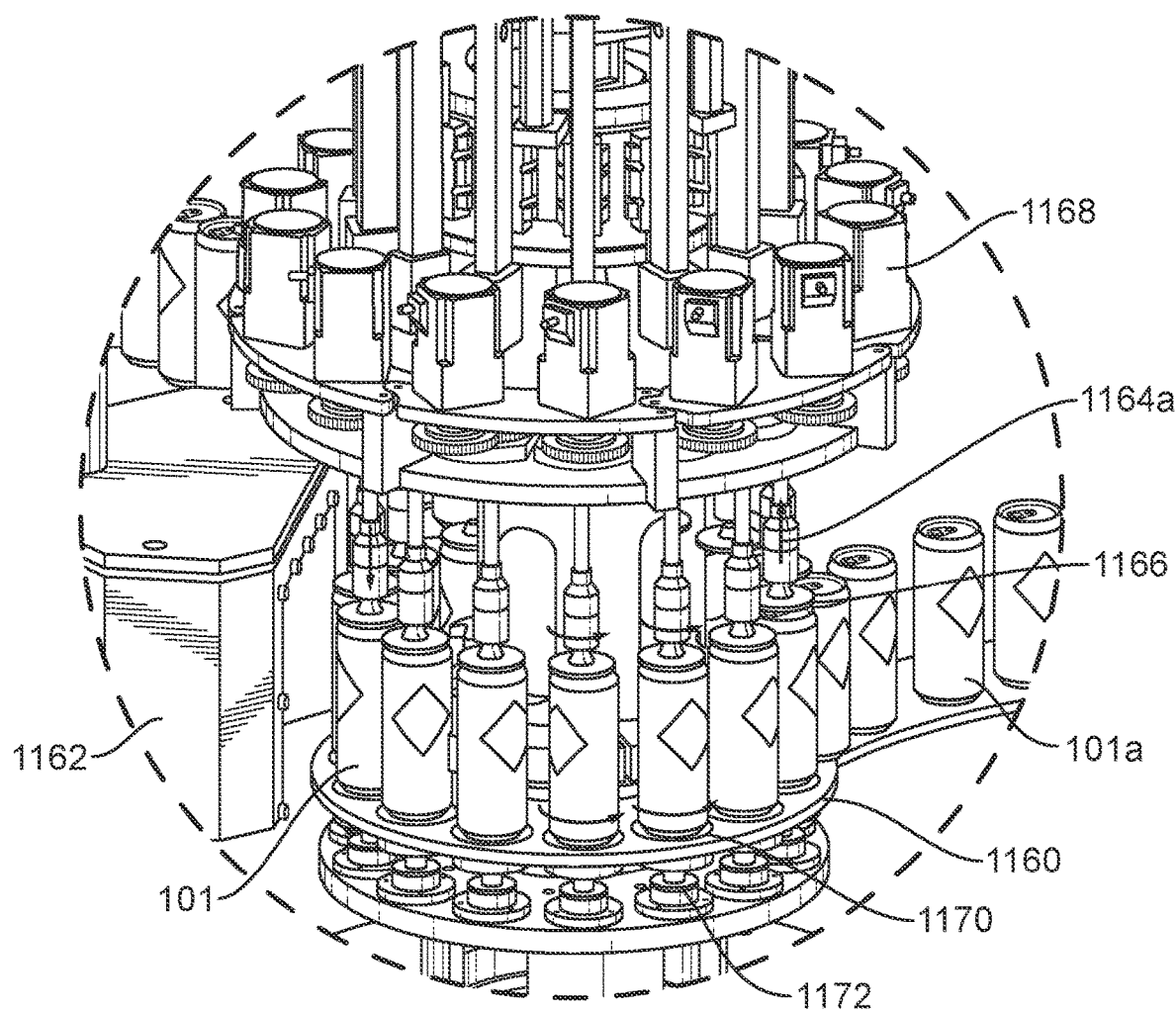
FIG. 11 is a perspective view of the orienting module of FIG. 10 showing motion of the containers.

FIG. 10 further shows the turning members 1064. Each turning member 1064 corresponds to one container 101. In order to turn each container 100, a turning member 1064 moves down in order to come into contact with the container 101. As the turning member 1064 moves down a disc 1066 located on the bottom of each turning member 1064 contacts a top of each container 101 when the turning member 1064 actuates from a retracted position to a deployed position. When the disc 1066 comes in contact with each container 101, each turning member 1064 rotates each container 101 a necessary amount to place the container 101 in the desired orientation. Further seen in FIG. 10, a plurality of surfaces 1070 located within the base 1060. Each of these surfaces 1070 corresponds to a turning member 1064 and to a container. The surfaces 1070 are also operatively connected to the processor and programmed to turn the same direction and the same amount as each of the turning members 1064. Thus the containers are turned evenly from the top and from the bottom, further ensuring stability during turning. The motor 1072 for each of these surfaces 1070 is located below the top surface of the base 1060. The particular orientation, with moving turning members 1064 above the containers and a vertically stationary surface 1070 below the containers allows for a smaller motor and smaller turning turret, since each container 101 does not need to be moved vertically. Once the containers 101 are properly oriented the containers 101 are moved to the grouping module 106. FIG. 11 shows a subsequent view of the orientation module of FIG. 10. In this view it is possible to appreciate the now oriented containers 101 which were previously oriented in different directions, as well as the now retracted turning members 1064, which were previously in contact with the tops of containers 101.

Figure 12:
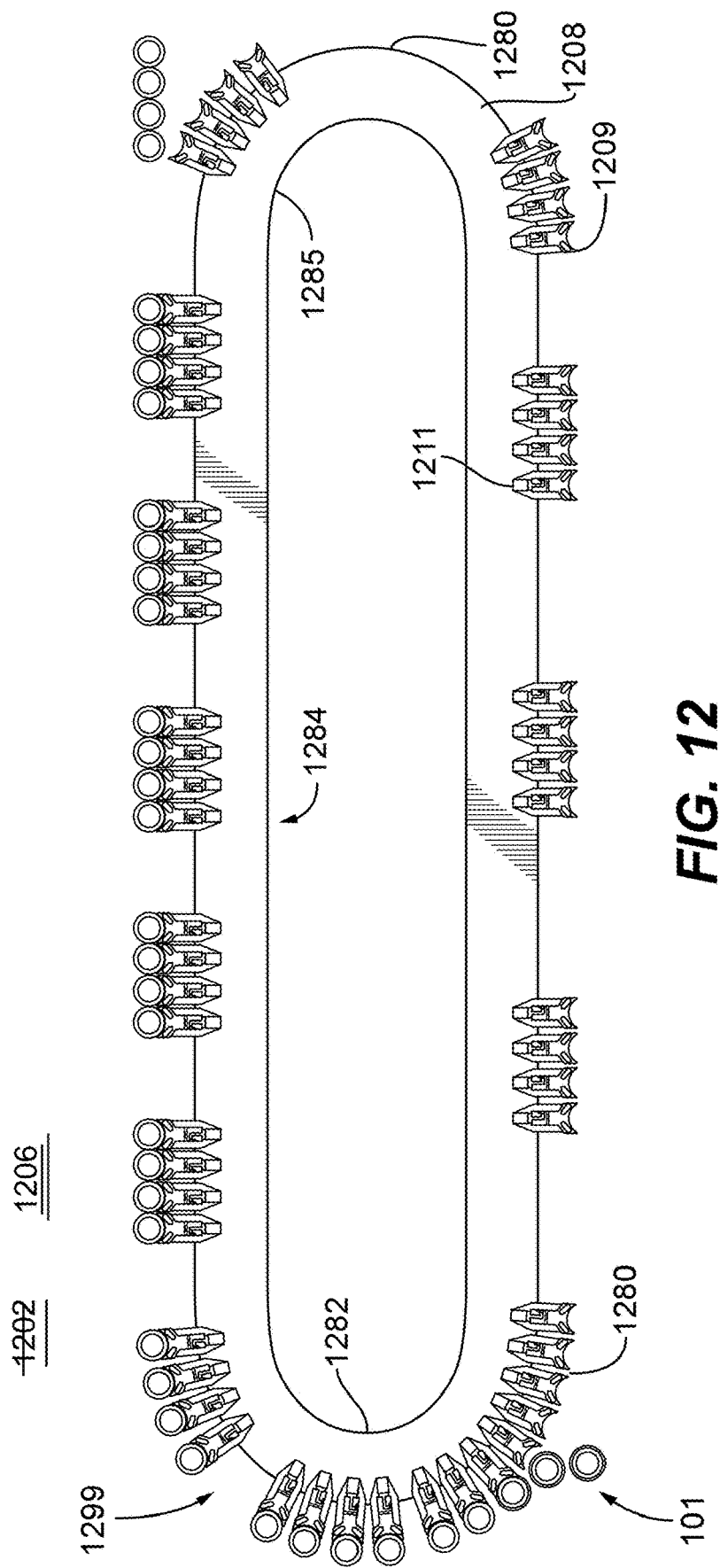
FIG. 12 is a top view of a grouping module of FIG. 1.

Referring now to FIG. 12, after containers 101 are oriented within the orienting module 1204, the stream of containers 101 are passed the grouping module 1206. The grouping module 1206 is responsible for grouping a necessary amount of containers 101 together, e.g. to begin forming packs of containers for subsequent packaging, while at the same time ensuring that the orientation of each individual container 101 remains unchanged from the orientation that was received from the orienting module 1204. As described above, a number of possibilities are presented for taking the stream of containers 101, and grouping them while ensuring that the desired orientation is maintained. FIG. 12 shows a first embodiment of the grouping module 1206 as was previously shown in FIG. 2. The grouping module 1206 includes a single oval track 1208 oriented in the horizontal plane. FIG. 12 further shows grippers 1209, which push the container 101 along the track attached to individual lugs 1211 where each lug is actuated by a linear servo drive 112 (shown in FIG. 1). The linear servo drive 112 (shown in FIG. 1) allows for programming individual or group lug 1211 speed profiles along the track 1208 for the lugs 1211 to follow.

As further seen in FIG. 12, as the containers 101 are circulated from the orienting module 1004 to the grouping module 1206, the lugs 1211 move the attached grippers 1209 in place to receive the containers 101. The lugs 1211 are arranged prior to picking up the containers 101 in a queuing section 1280, and accelerate around the first curved portion of the track once a desired group (in this case it is four containers 101) of containers 101 have been contacted in order to create a gap 1299 between this groups and the next group of containers 101, while maintaining the desired orientation of the containers 101 of the group of containers 101. Once the group has reached the straight section 1284, the group of containers 101 travel at a constant speed. At this point various packaging steps can take place. Each formed group can meet a group from the mirrored set II shown in FIG. 1 to make a single group, e.g. an eight-pack, or four-pack.

Figure 13:
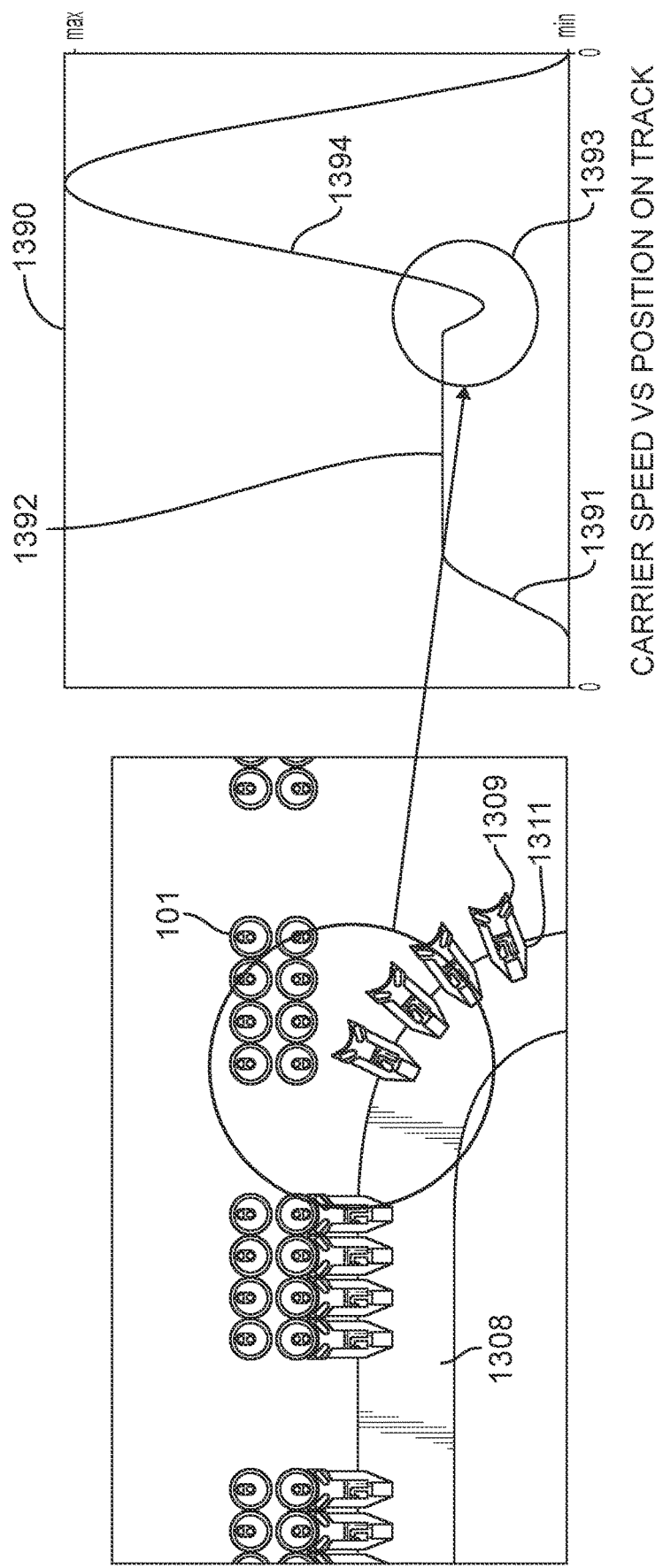
FIG. 13 shows a graphical interpretation of the velocity profile for lugs and grippers for a grouping module of FIG. 12.

With reference now to FIG. 13, as the lugs 1211 travel around the track, the lugs 1211 follow a programmed speed profile. This allows any plurality of lugs 1211 to be arranged together to form a desired group (two together, three together, etc.). After the lugs 1211 and grippers 1209 have reached the end of the first straight section 1284, the lugs 1211 peel away from the containers 101 at location 1285 in FIG. 12. One method the grippers 1209 and lugs 1211 peel away is by slowing down to allow the containers 101 to keep moving forward at the point where the straight portion turns to the second curved portion. This speed profile allows for the gripper and container 101 to gain separation from each other before the gripper changes directions, preventing the gripper from shifting, turning, or otherwise disturbing the containers 101. After the grippers 1209 are free of the containers 101, they accelerate around the rest of the second curved portion of the track and the second straight portion of the track to join the lugs 1211 in the queuing section.

FIG. 13 shows a graphical interpretation of the velocity profile for a lug and gripper as described above. The profile includes an acceleration 1391 immediately after contacting the last container 101 in the intended group of container 101 (the second in the package of two, and the third in a package of four). The acceleration 1391 allows the group to produce the gap 1299 from the next group. Afterwards containers 101 are moved along at a constant speed 1392, while packaging steps to the containers 101. In order to drop off the container 101 smoothly without disturbing them the lugs 1311 and gripper can be slowed down 1393, as the containers 101 are moved away by another conveyor or lug and carrier combination, as described above. After the containers 101 are dropped off the grippers 1309 the lugs 1311 and grippers 1309 accelerate 1394 to the highest velocity in order to return to the queuing section before picking up another container.

Figure 14:
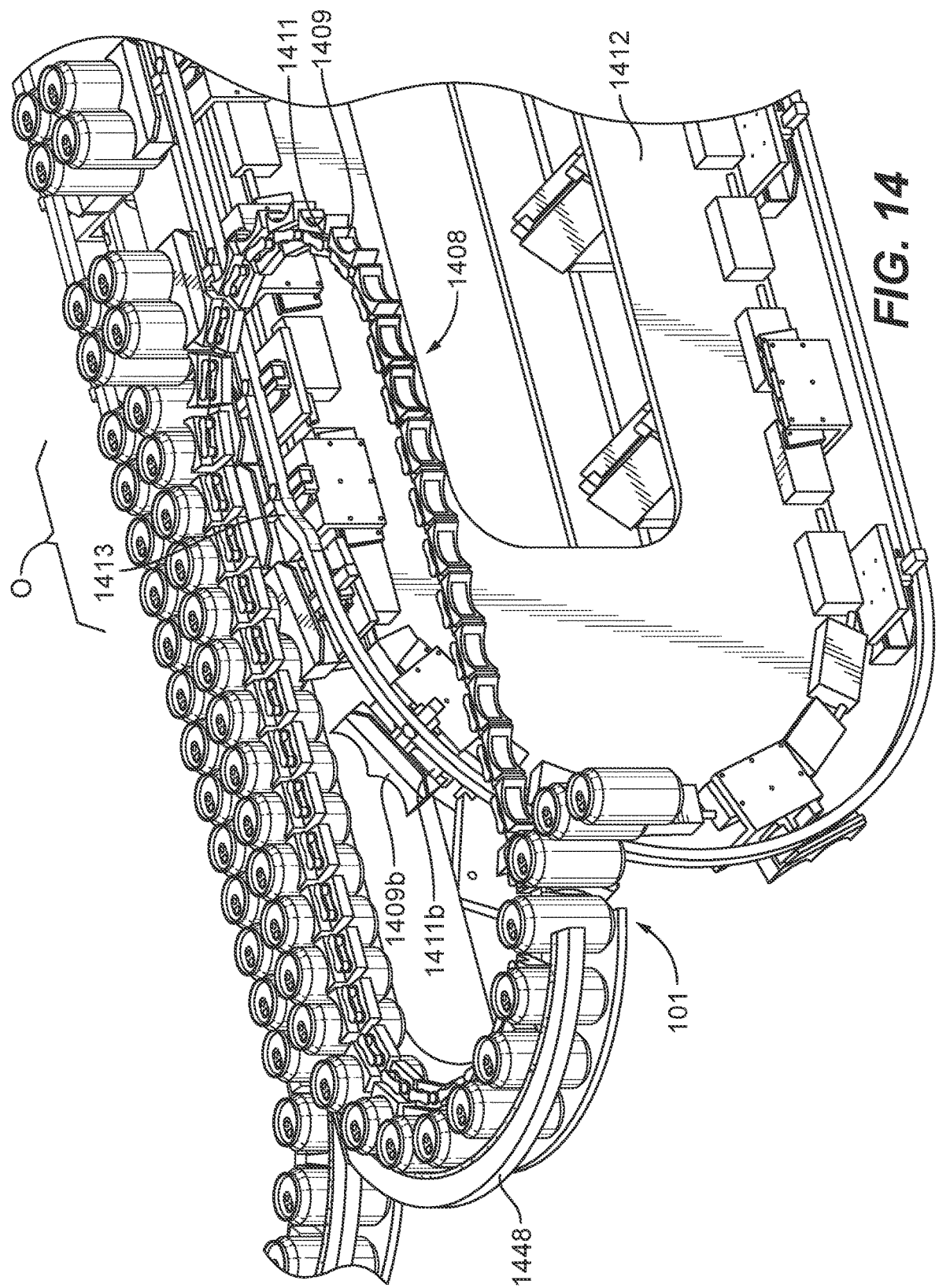
FIG. 14 is a perspective view of the system of FIG. 5, showing interaction of the second track with the first track.

FIG. 14, shows another embodiment wherein the lugs 1411 are each attached and driven by a linear chain 1410, where the lugs 1411 and containers 101 travel at a constant velocity around the track 1408. This embodiments conveys the stream of containers 101 to a downstream packaging station or to second set of lugs 1411 and grippers 1409 that would produce the groups of containers 101.

Figure 15:
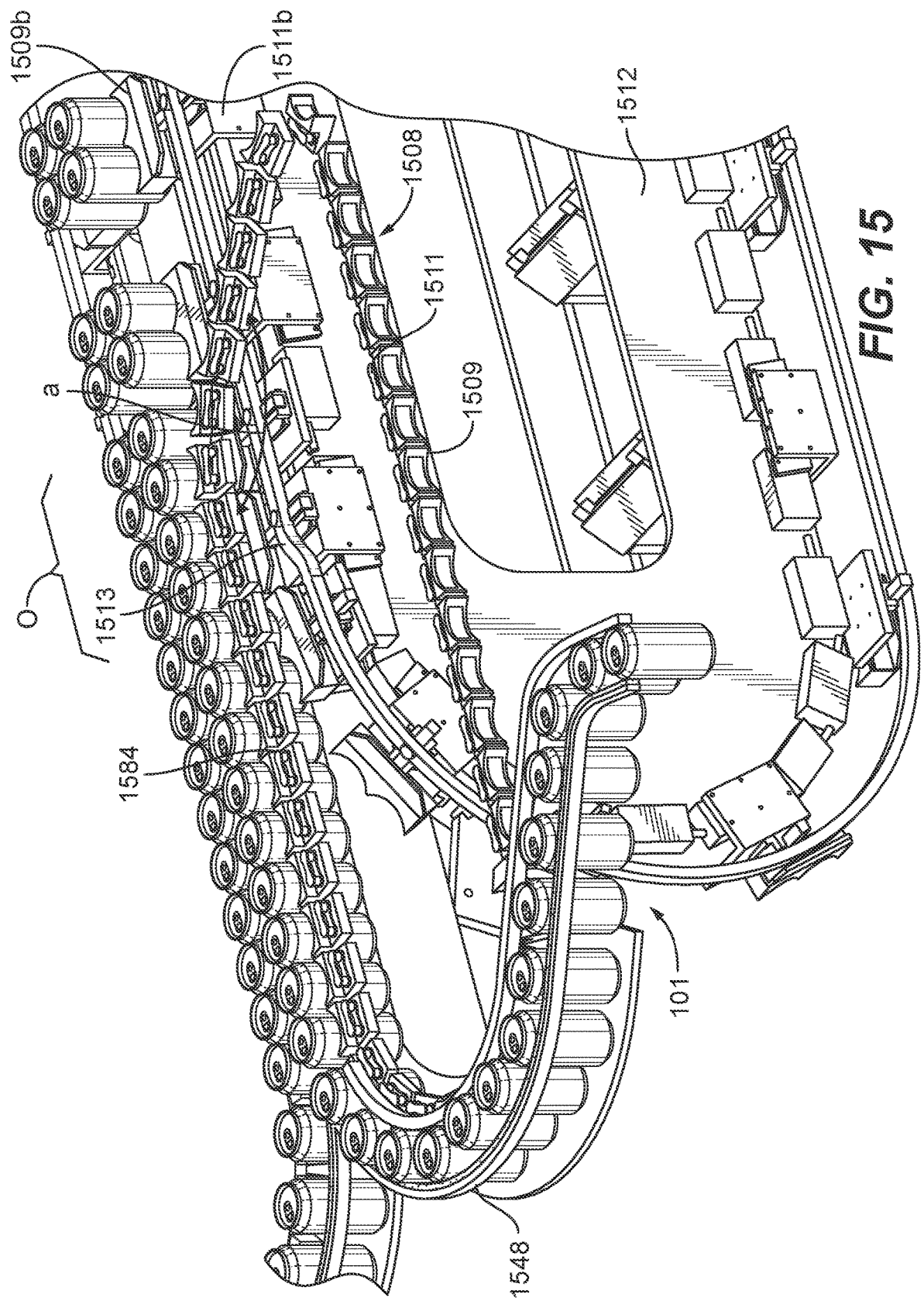
FIG. 15 is a perspective view of the system of FIG. 6, showing interaction of the second track with the first track.

FIG. 15 shows yet another embodiment of the track 1508 where the track 1508 is horizontal but not strictly oval in shape. The track 1508 is skewed at one point at location "a". The oblong shape allows for a smoother departure of the grippers 1509 from each of the containers 101, since the turning angle of the grippers 1509 is not as sharp, this decreases the chances of the gripper 1509 shifting the container as it peels away.

Each of the embodiments shown in FIGS. 14 and 15 can be paired with a second track responsible for receiving the containers 101 from the linear chain and grouping them, again while not disturbing and disorienting the containers 101. The grouping modules 106 in these embodiments include a second track 1512 to move a second plurality of lugs 1511b and a second plurality of grippers 1509b after receiving containers 101 from the first track. The second set of grippers 1509b group the containers 101 into packs, and move the packs along also without changing an orientation of the each container. While, the first plurality of grippers 1509 and the first plurality of lugs 1511 move about the horizontal plane, the second plurality of grippers 1509 and the second plurality of lugs 1511 move about a vertical plane. Further, the second track 1512 follows an oval but includes a horizontal protuberance 1513 which forces each lug and attached gripper 1509b towards the container 101. The second track 1512 can include a linear motor servo drive to actuate each of the lugs 1511b along the second track 1512. The lugs 1511b and grippers 1509b of the second track, are positioned below the grippers 1509 and lugs 1511 of the first track when both sets contact the container 101. This allows the system 100 to handle taller containers 101.

Further seen in FIGS. 15 and 14, the first track 1508 and the second track 1512 partially overlap each other in the area indicated in FIG. 15 by reference the letter "o" and are partially aligned in the same direction, such that the grippers 1509 of the first track and the grippers 1509 of the second track contact the container 101 at the same time for a period of time in the area "o" as track 1208 hands the containers 101 of the second track 1212. The overlap of the tracks also allows for a more compact floor space arrangement because two vertical or two horizontal tracks would not be able to overlap without having to move the container vertically. During handing off, the container 101 from the first set of gripper 1509 to the second set of gripper 1509, the container 101 are simultaneously driven by the container 101 of stream of containers 101 by a gripper 1509b of the second plurality of grippers 1509b along the straight path of the first track. The grippers 1509a of the first plurality of grippers 1509a are withdrawn as they peel away from contacting the container 101 of the stream of containers 101.

The gripper 1509a of the first plurality of grippers 1509a and the gripper 1509b of the second plurality of grippers 1509b drive the respective container 101 at the same velocity when both are in contact with the container. This arrangement allows for a smooth transition from the containers 101 being pushed along by the first set of lugs 1511 and grippers 1509 to later the containers 101 being pushed along by the second set of grippers 1509b. Also seen in the previously discussed Figures, as the lugs 1511 follow a track, and are connected to corresponding gripper bodies 144, a curved guide 1448 is placed at the location where the grippers 1509 pick up the containers 101 from the orienting module 1504 and follows the track to the first straight section. The guide 1448 helps bias the containers 101 against the gripper bodies.

Figure 16:
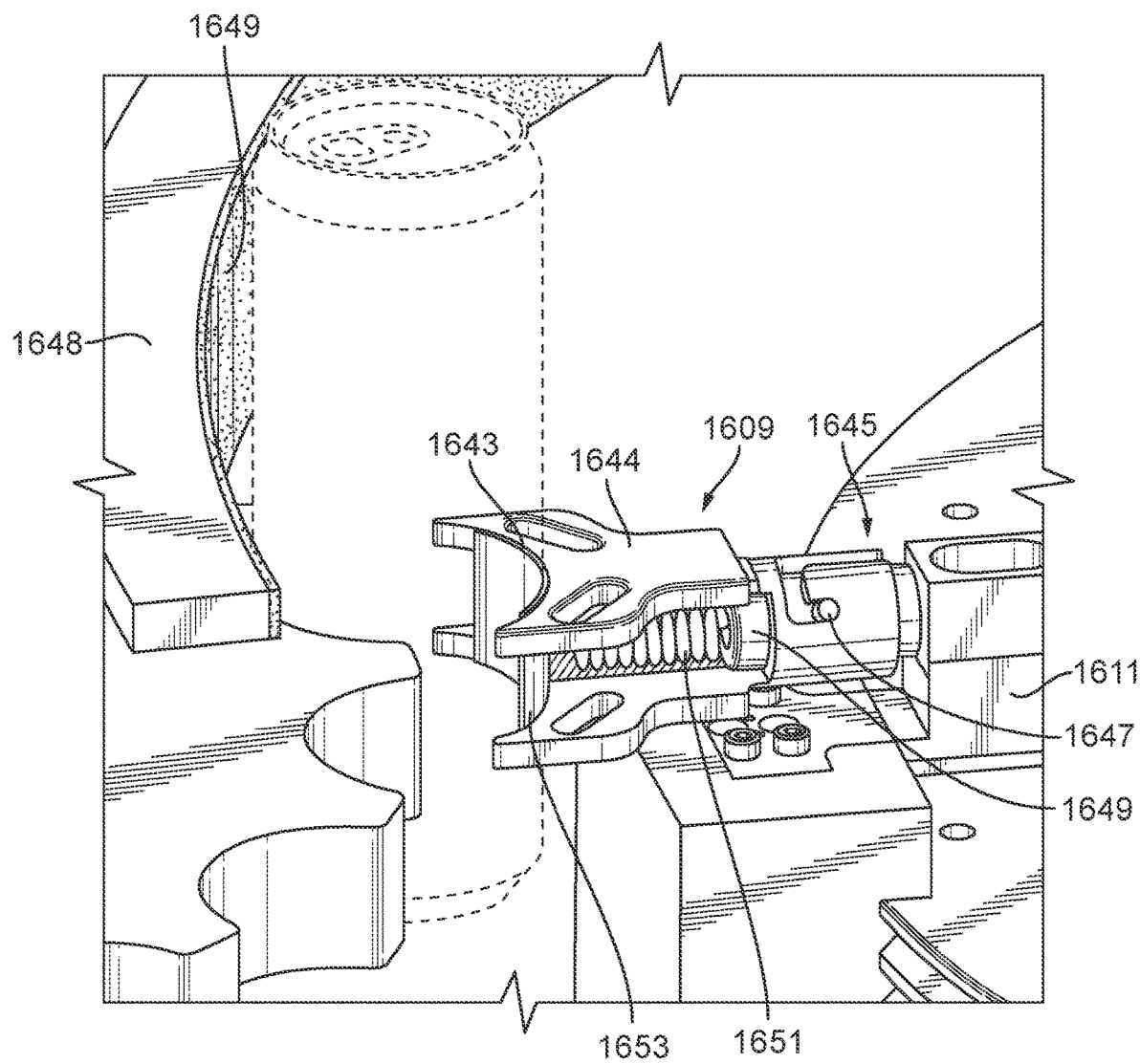
FIG. 16 is a perspective view of a gripper of the system of FIG. 1.

FIG. 16 shows a partial cut away view of the gripper 1609 used by grouping station in the embodiments described above. Each gripper 1609 includes a gripper body 1644, which partially surrounds and drives a corresponding container 101 along the track. Each gripper body 1644 includes a receiving end 1643 and a locking end 1645. Each gripper body 1643 is coupled by the locking end 1645 to the lug 1611. The coupling 1645 which is located on the locking end 1645 of each gripper body 142 is a bayonet style lock. This coupling style allows for an easy changeover of the gripper 1609 depending on the size and shape of the container. Each lug 1611 includes a horizontally extended shaft 1649 configured to connect to the coupling of the gripper body 1643. FIG. 16 further shows a dampener 1651 positioned within each gripper body 142. The dampener 1651, e.g. a spring, dash pot, cushion, or the like, allows for smoothly reacting to a container 101 that is out of place and also acts as a shock absorber in order to not damage the container 101 when coming into contact with the container. An insert 1653 can be placed in the convex portion of the gripper body such that when it comes in contact with the container 101 it helps keep the container 101 oriented in the proper position. The insert 1653 includes material having a higher coefficient of friction than the gripper body 1644. The insert 1653 can be an adhesive strip, such as fugitive glue. The insert 1653 also has a higher coefficient of friction than a contact surface of the guide described above. This combination of friction coefficients allows the gripper to slide the container 101 along the guide without the container 101 changing an orientation or slipping from the gripper, especially along the curved portion of the track where the lug and gripper are accelerating. As the gripper 1609 and container 101 move past the guide, the insert 1653 helps maintain the orientation of the container. This type of adhesive allows the gripper to keep the container 101 from rotating, but also allows the gripper to peel away at the necessary stage without affecting the orientation of the container.

Figure 17:
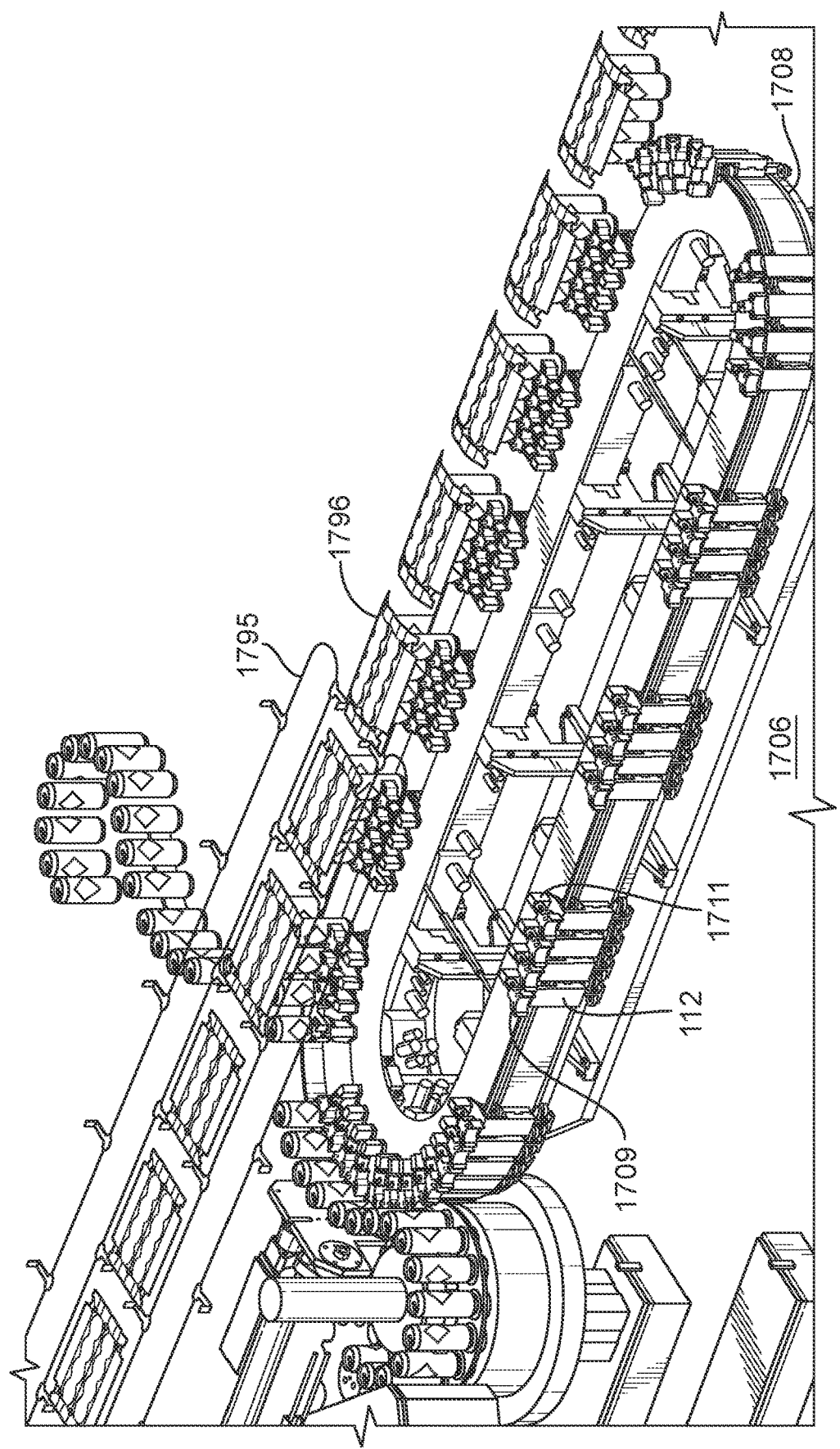
FIG. 17 is a perspective view of a system of FIG. 1, showing a possible placement of a packing apparatus.

FIG. 17, shows how an embodiment previously shown in FIGS. 1, 2, and 7 can be used in conjunction with a packaging apparatus 1795. The packaging apparatus 1795 partially overlaps with the track 1708 and is able to overlay packaging 1796, whether it is cardboard as shown or plastic wrap, while the grippers 1709 are still in contact with the containers 101. This arrangement further ensures that containers keep their intended orientation all the way through the packaging process.

The methods and systems of the present disclosure, as described above and shown in the drawings, provide for a packaging system with superior properties. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A method of grouping containers into a package of containers comprising:
    conveying a stream of containers using a first plurality of grippers in contact with the containers along a portion of a first track;
    transferring the containers to a second plurality of grippers by:
        (i) moving each of the containers by a respective gripper of the second plurality of grippers while maintaining contact with a respective gripper of the first plurality of grippers along a second portion of the first track; and
        (ii) withdrawing the respective gripper of the first plurality of grippers from contacting its respective container of the stream of containers after the respective gripper of the second plurality of grippers is in contact with the respective container.

2. The method of claim 1, wherein the gripper of the second plurality of grippers contacts the container below the gripper of the first plurality of grippers.

3. The method of claim 1, wherein the gripper of the first plurality of grippers turns along a curve of the first track after withdrawing.

4. The method of claim 1, wherein the gripper of the first plurality of grippers and the gripper of the second plurality of grippers each drive its respective container at the same velocity while driving the container.

5. The method of claim 1, wherein the gripper of the second plurality of grippers approaches the container perpendicular to the second track in order to initially contact the container.

6. The method of claim 1, further comprising maintaining an orientation of each container when the gripper of the first plurality of grippers is withdrawn.

7. The method of claim 1, wherein the gripper of the first plurality of grippers accelerates after initially contacting the container.

8. The method of claim 7, wherein the gripper of the first plurality of grippers accelerates along a first curved section of the track.

9. The method of claim 1, wherein the gripper of the first plurality of grippers maintains a constant speed during a straight portion of the first track.

10. The method of claim 9, wherein the gripper of the first plurality of grippers decelerates when withdrawing the gripper of the first plurality of grippers from contacting the container.

11. The method of claim 9, wherein the gripper of the first plurality of grippers accelerates after withdrawing the gripper of the first plurality of grippers from contacting the container.

12. A conveyor system for grouping containers comprising:
    a first track configured to move a first plurality of lugs, wherein each of the first plurality of lugs has a gripper coupled thereto configured to engage with and drive a container along the first track; and
    a second track configured to move a second plurality of lugs, wherein each of the second plurality of lugs has a gripper coupled thereto configured to receive the container from the first track, and to move the container along the second track,
    wherein the gripper of the second track is configured to contact the container while the gripper of the first track contacts the container along a portion of the first track, and
    wherein each of the first plurality of lugs is configured to move along the first track and each of the second plurality of lugs is configured to move along the second track such that the gripper of the first track is withdrawn from contacting the container after the gripper of the second track comes into contact with the container.

13. The system of claim 12, wherein the first plurality of grippers and the first plurality of lugs are configured to move about a horizontal plane and the second plurality of grippers and the second plurality of lugs are configured to move about a vertical plane.

14. The system of claim 12, wherein the first track follows an oval.

15. The system of claim 12, wherein the first track includes at least a first rounded section, a first straight section, a second rounded section, and a second straight section.

16. The system of claim 15, wherein the first track includes a third straight section.

17. The system of claim 12, wherein the second track follows an oval and includes at least one protuberance configured to actuate the second plurality of grippers in an orthogonal direction to a direction of travel of the stream of containers.

18. The system of claim 12, wherein the first track includes a linear motor drive configured to actuate each of the first plurality of lugs along the track.

19. The system of claim 12, wherein the first track includes a linear chain configured to actuate each of the first plurality lugs carriers along the first track.

20. The system of claim 12, wherein the second track includes a linear motor drive configured to actuate each of the lugs along the second track.

* * * * *